United States Patent Office 2,757,120
Patented July 31, 1956

2,757,120
COMPOSITIONS CONTAINING ESTERS OF PYRIDINE DICARBOXYLIC ACIDS AS INSECT REPELLENTS AND METHOD OF USING

Nelson J. Leonard, Urbana, Ill., assignor to Phillips Petroleum Company, a corporation of Delaware No Drawing. Application August 6, 1951,
Serial No. 240,602

12 Claims. (Cl. 167—33)

This invention relates to novel insect repellents. In one aspect this invention relates to insect repellents comprising diethyl, di-n-butyl and/or di-n-propyl esters of pyridine dicarboxylic acids. In another aspect this invention relates to a method for repelling insects from a chosen area. In still another aspect this invention relates to a method for repelling flies.

Flies, mosquitoes and other insects are troublesome pests in homes, restaurants, grocery stores, and the like. The control of these pests by the use of ordinary insecticides is difficult because such materials have been found to be partially or entirely ineffective against them.

The principal use for repellents has been against mosquitoes but considerable attention has been given to repelling flies. New strains resistant to DDT and several other insecticides have developed so the attention has again shifted to the development of repellents. This is especially true for the control of the stable fly and the housefly for which no insecticide has given livestock much protection. It is felt by many workers in the field that repellents are the best solution to this problem. A superior fly repellent would have a very wide use for the protection of man and animals.

Furthermore, the sight of dead flies in a public place where food is handled is more objectionable than is the sight of live flies. It is considered more desirable to repel insects, such as flies, from articles of food or places where food is handled than to kill the flies with a poison applied thereto.

I have now discovered that the diethyl, di-n-butyl and di-n-propyl esters of pyridine dicarboxylic acids are effective agents for repelling insects such as flies from surfaces frequented by them, when applied to such surfaces in any suitable form, such as solution, dust, emulsion, suspension, aerosol, fog, or the like or as a pure compound. Solvents or carriers which I have found applicable to the present invention include those which are substantially inert with respect to the active repellent ingredient. Among these materials which are useful for this purpose are acetone, kerosene, naphthas, and other liquid hydrocarbons boiling preferably above atmospheric temperature. Solid inert carrier materials are utilized, such as, for example, talc, kieselguhr, and other inert carriers, when preparing dusts. The active repellent ingredients of my invention may be applied in the form of an aqueous emulsion or dispersion, preferably when employing a wetting or dispersing agent, as for example, Span 20, (sorbitan monolaurate), Triton X-100, (alkylated aryl polyether alcohol), Tween 20, (sorbitan monolaurate polyoxyethylene derivative), and others.

Not every ester of pyridine dicarboxylic acid is effective as an insect repellent. Thus, the dimethyl ester of pyridine-2,5-dicarboxylic acid and the di-iso-propyl ester of pyridine-2,5-dicarboxylic acid have no repellent activity for flies at a concentration as high as 10 per cent.

The dialkyl esters of pyridine dicarboxylic acids of this invention have the characteristic structure

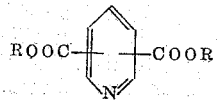

wherein each R is the same alkyl radical selected from the group consisting of ethyl, n-propyl, and n-butyl.

When employing the diethyl, di-n-butyl and di-n-propyl esters of pyridine dicarboxylic acids in a solvent or carrier, the lower effective limit of said ester concentration is about 0.5 per cent by weight. Similarly, when employing dusts, a concentration of the active ingredient is preferably within the limits of 1 to 20 weight per cent. However, there is no upper limit to the concentration that can be employed, except that dictated by economy. In some instances the active ingredient can be advantageously applied as the pure compound without a carrier of any kind. This is especially true of the di-n-propyl and di-n-butyl esters of pyridine-2,5-dicarboxylic acid, which are liquids and may be advantageously painted or sprayed on a surface per se.

The materials of the present invention have desirable physical characteristics and have little odor.

The pyridine dicarboxylic acid esters are prepared by esterifying the selected dicarboxylic acid with the appropriate alcohol so as to produce the desired ester. Thus the ethyl ester of pyridine-2,5-dicarboxylic acid is prepared by the esterification of pyridine-2,5-dicarboxylic acid with ethyl alcohol. The preparation of esters of pyridine dicarboxylic acids is described by Gordon Black, Elizabeth Depp and B. B. Parson, Journal of Organic Chemistry, vol. 14, pages 14–21, 1949 (Chemical Abstracts, vol. 43, 3825 C, 1949) and M. Prostenik and L. Filipovic (Chem. Inst., Zagreb), Archiv Kemi., vol 18, pages 3–9, 1946 (Chemical Abstracts, vol. 42, 3398C, 1948).

The repellent materials of my invention can be applied for their intended purpose in several ways. The most advantageous and presently preferred way is to spray a liquid composition on the surface to be treated. However, aerosols are employed advantageously in closed areas. Generally, about one to 10 grams of the active ingredient per 100 square feet of surface is advantageously applied.

Thus according to the practice of this invention an area from which insects are to be repelled is treated with a composition whose essential ingredient is one of the diethyl, di-n-butyl or di-n-propyl ester of pyridine dicarboxylic acids.

EXAMPLE I

In accordance with the sandwich bait method described by L. B. Kilgore in Soap, June 1939, several 1 x 4 inch strips of cardboard were coated with a smooth thin film of unsulfured molasses leaving an uncoated margin of about ¼ inch on all four sides. The prepared cardboard strips were then oven-dried at 45° C.

Highly porous paper strips, cut from cushion sheets used in mimeograph stencils, were impregnated with the candidate repellents in varied amounts. Impregnation of the porous strips was effected by immersing them in acetone solutions of the candidate repellents, and then allowing the strips to dry over a period of from 4 to 6 hours. The impregnated strips were the same size as the baited cardboards. An impregnated strip was superimposed on each baited cardboard and fastened in place by stapling. The loose fiber construction of the impregnated paper permits the flies to remove the molasses through it.

The prepared strips, i. e., the sandwich baits, were then exposed to house flies (*Musca domestica*), over 5 days old, which had been starved for 6 hours. Counts of the number of flies feeding on the strips were taken periodically for a period of 2½ hours. A non-repellent material in the sandwich bait becomes black with flies soon after being exposed and the bait will often be entirely consumed in 5 minutes.

Results of the tests using compounds of this invention as fly repellents in accordance with the method described above are tabulated as follows:

Table I

| | Concentration[1] of Dipping Solution, Percent | Number of Flies Feeding After X Minutes ||||||||
|---|---|---|---|---|---|---|---|---|---|
| | | 5 | 15 | 30 | 45 | 60 | 90 | 120 | 150 |
| Diethyl ester of pyridine-2,5-dicarboxylic acid | 5 | 0 | 0 | 0 | 0 | 0 | 0 | 0 | 0 |
| | 2.5 | 0 | 0 | 0 | 0 | 0 | 0 | 0 | 0 |
| | 1.25 | 0 | 0 | 0 | 0 | 0 | 0 | 0 | 0 |
| | 0.5 | 0 | 0 | 0 | 0 | 0 | 0 | 0 | 0 |
| | 0.25 | 7 | 50+ | gone | | | | | |
| Di-n-propyl ester of pyridine-2,5-dicarboxylic acid | 5 | 0 | 0 | 0 | 0 | 0 | 0 | 0 | 0 |
| | 1 | 0 | 0 | 0 | 0 | 0 | 0 | 0 | 0 |
| | 0.5 | 0 | 0 | 0 | 0 | 0 | 0 | 0 | 0 |
| Di-n-butyl ester of pyridine-2,5-dicarboxylic acid | 2 | 0 | 0 | 0 | 0 | 0 | 0 | 0 | 0 |
| | 1 | 0 | 0 | 0 | 0 | 0 | 0 | 0 | 0 |
| | 0.5 | 0 | 0 | 0 | 0 | 0 | 0 | 0 | 0 |
| Diethyl ester of pyridine-2,6-dicarboxylic acid | 2 | 0 | 0 | 0 | 0 | 0 | 0 | 0 | 0 |
| | 1 | 0 | 0 | 0 | 1 | 0 | 0 | 0 | 0 |
| | 0.5 | 0 | 0 | 0 | 0 | 0 | 0 | 0 | 0 |
| Di-n-propyl ester of pyridine-2,6-dicarboxylic acid | 2 | 0 | 0 | 0 | 0 | 0 | 0 | 0 | 0 |
| | 1 | 0 | 0 | 0 | 0 | 0 | 0 | 0 | 0 |
| | 0.5 | 0 | 0 | 0 | 0 | 0 | 0 | 0 | 0 |
| Di-n-propyl ester of pyridine-2,4-dicarboxylic acid | 2 | 0 | 0 | 0 | 0 | 0 | 0 | 0 | 0 |
| | 1 | 0 | 0 | 0 | 0 | 0 | 0 | 0 | 2 |
| | 0.5 | 0 | 0 | 0 | 0 | 1 | 2 | 0 | 0 |
| Diethyl ester of pyridine-2,4-dicarboxylic acid | 2 | 0 | 0 | 0 | 0 | 0 | 0 | 0 | 0 |
| | 1 | 0 | 0 | 0 | 0 | 0 | 0 | 0 | 0 |
| | 0.5 | 4 | 4 | 12 | 30 | 25 | 20 | gone | |
| Di-n-propyl ester of pyridine-2,3-dicarboxylic acid | 2 | 0 | 0 | 0 | 3 | 10 | 3 | 10 | 0 |
| | 1 | 0 | 0 | 0 | 50+ | 50 | 3 | 3 | gone |
| | 0.5 | 0 | 0 | 0 | 20 | 50 | 19 | 10 | gone |
| Diethyl ester of pyridine-2,3-dicarboxylic acid | 2 | 0 | 0 | 0 | 0 | 0 | 12 | 25 | 10 |
| | 1 | 0 | 0 | 0 | 0 | 1 | 0 | 10 | 30 | 35 |
| | 0.5 | 0 | 0 | 8 | 40 | 40 | 20 | 1 | 0 | gone |

[1] Concentration, weight percent of candidate repellent in acetone solution employed in impregnation of porous strips.

EXAMPLE II

In accordance with the sandwich bait method described in Example I, fly repellent tests were conducted using the diethyl ester of pyridine-2,5-dicarboxylic acid, the di-n-propyl ester of pyridine-2,5-dicarboxylic acid, and the di-n-butyl ester of pyridine-2,5-dicarboxylic acid. Concomitant tests were also conducted using two commercially available fly repellents, namely, alpha, alpha-dimethyl-alpha'-carbobutoxy dihydro-gamma-pyrone, and a repellent which is described as a mixture of 2-phenylcyclohexanol and 2-cyclohexylcyclohexanol. Data on these tests are listed in the following table.

congregated on the windows of this room no matter what the light intensity on either side of the windows. In testing our fly repellents, these windows were cleaned and then sprayed with a 1 weight per cent acetone solution of the candidate repellent to provide about 0.02 gram of repellent per square foot of glass. After the solvent had evaporated, flies were introduced into the room. Both the diethyl ester and the di-n-propyl ester of pyridine-2,5-dicarboxylic acid repelled flies from the windows for 24 hours. After a period of one month a 95% repellency from these windows was observed.

EXAMPLE IV

A practical test was conducted wherein fly roosting places in a stable were painted with a 50 weight per cent Table II

| | Concentration[1] of Dipping Solution, Percent | Number of Flies Feeding After X Minutes ||||||||||
|---|---|---|---|---|---|---|---|---|---|---|---|
| | | 5 | 15 | 30 | 45 | 60 | 90 | 120 | 150 | 300 | 480 | 1,080 (18 hrs) |
| Diethyl ester of pyridine-2,5-dicarboxylic acid | 1 | 0 | 0 | 0 | 0 | 0 | 0 | 0 | 0 | 0 | 0 | 10% gone |
| | 0.5 | 0 | 0 | 0 | 0 | 0 | 0 | 0 | 0 | 0 | 0 | 90% gone |
| | 0.25 | 0 | 0 | 0 | 0 | 0 | 0 | 0 | 0 | 12 | 90% gone | gone |
| Di-n-propyl ester of pyridine-2,5-dicarboxylic acid | 1 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 10% gone | 15% gone |
| | 0.25 | 0 | 0 | 0 | 0 | 0 | 0 | 0 | 0 | 33% gone | gone | gone |
| Di-n-butyl ester of pyridine-2,5-dicarboxylic acid | 1 | 0 | 0 | 0 | 0 | 0 | 0 | 0 | 0 | 80% gone | gone | |
| | 0.5 | 0 | 0 | 0 | 0 | 0 | 0 | 0 | 0 | 90% gone | gone | |
| | 0.25 | 0 | 0 | 0 | 0 | 0 | 0 | 0 | 0 | gone | | |
| Indalone, commercial fly repellent[2] | 10 | 0 | 0 | 2 | 4 | 12 | 10 | 2 | 3 | gone | | |
| | 5 | 1 | 3 | 8 | 12 | 1 | 6 | 5 | gone | | | |
| Navy insect repellent[3] | 10 | 0 | 0 | 0 | 0 | 0 | 0 | 0 | 0 | gone | gone | |
| | 5 | 0 | 0 | 0 | 0 | 0 | 0 | 0 | 3 | gone | | |
| | 2 | 1 | 7 | 10 | 50+ | 35 | 15 | 15 | gone | | | |

[1] Concentration, weight percent of candidate repellent in acetone solution employed in impregnation of porous strips.
[2] Alpha-alpha-dimethyl-alpha-carbobutoxydihydro-gamma-pyrone.
[3] 2-phenylcyclohexanol and 2-cyclohexylcyclohexanol.

The results of these tests demonstrate the superiority of the compounds of the present invention over prior art repellents which are recognized as being satisfactory insect repellents. Thus the last two compounds in above Example II are commercial repellents and are compared to compounds of the invention.

EXAMPLE III

A semi-practical test was conducted in a small room wherein flies were confined. It was noted that flies acetone solution of the diethyl ester of pyridine-2,5-dicarboxylic acid. Both stable flies (*Stomoxys calcitrans*) and houseflies were repelled from the treated areas for a period of 2 weeks.

A similar test was conducted wherein the di-n-propyl ester of pyridine-2,5-dicarboxylic acid, a liquid, was painted on fly roosting places in a stable and found to be 90 to 95 per cent effective in repelling both houseflies and stable flies for a period of 2 weeks.

The results of tests as recorded in the above examples show that diethyl and di-n-propyl esters of pyridine dicarboxylic acids are effective insect repellents.

As hereinbefore noted the dimethyl and di-iso-propyl esters of pyridine-2,5-dicarboxylic acid were found to be ineffective as fly repellents at concentrations of as high as 10 per cent.

Baby chicks were fed a commercial chick mash containing 1.0 weight per cent diethyl ester of pyridine-2,5-dicarboxylic acid and other baby chicks were fed commercial chick mash containing 1.0 weight per cent di-n-propyl ester of pyridine-2,5-dicarboxylic acid. All the chicks were normal at the end of a one month period. This is indicative but not conclusive of the non-toxicity of these compounds.

Reasonable variation and modification are possible within the scope of the foregoing disclosure and the appended claims to the invention the essence of which is that the diethyl, di-n-butyl and di-n-propyl esters of pyridine dicarboxylic acid have been found to be effective fly repellents, superior to those heretofore known.

I claim:

1. A composition comprising as an essential ingredient dissolved in a hydrocarbon solvent which boils above atmospheric temperature in a concentration sufficient to deposit, by spraying, from 1 to 10 grams per hundred square feet of surface sprayed of a compound selected from the group consisting of (a) the diethyl ester of pyridine dicarboxylic acid, (b) the di-n-propyl ester of pyridine dicarboxylic acid, and (c) the di-n-butyl ester of pyridine dicarboxylic acid.

2. The composition of claim 1 wherein the essential ingredient is the diethyl ester of pyridine dicarboxylic acid.

3. The composition of claim 1 wherein the essential ingredient is the diethyl ester of pyridine-2,5-dicarboxylic acid.

4. The composition of claim 1 wherein the essential ingredient is the di-n-propyl ester of pyridine dicarboxylic acid.

5. The composition of claim 1 wherein the essential ingredient is the di-n-propyl ester of pyridine-2,5-dicarboxylic acid.

6. The composition of claim 1 wherein the essential ingredient is the di-n-butyl ester of pyridine dicarboxylic acid.

7. The composition of claim 1 wherein the essential ingredient is the di-n-butyl ester of pyridine-2,5-dicarboxylic acid.

8. A method for repelling flies from a surface frequented by flies which comprises applying to said surface in an amount of from about 1 to 10 grams per 100 square feet an ester of pyridine dicarboxylic acid selected from the group consisting of diethyl ester of pyridine dicarboxylic acid, di-n-propyl ester of pyridine dicarboxylic acid and di-n-butyl ester of pyridine dicarboxylic acid, said ester being dissolved in a hydrocarbon solvent which boils above atmospheric temperature.

9. A composition comprising as an essential ingredient dissolved in an organic solvent selected from the group consisting of acetone and a hydrocarbon which boils above atmospheric temperature, at least 0.5 weight per cent of a compound having the characteristic structure

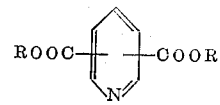

wherein each R is the same alkyl radical selected from the group consisting of ethyl, n-propyl, and n-butyl.

10. A composition comprising as an essential ingredient dissolved in an organic solvent selected from the group consisting of acetone and a hydrocarbon which boils above atmospheric temperature, in a concentration sufficient to deposit from 1 to 10 grams per 100 square feet of surface of a compound having the characteristic structure

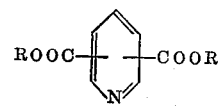

wherein each R is the same alkyl radical selected from the group consisting of ethyl, n-propyl, and n-butyl.

11. A method for repelling flies from a surface frequented by flies which comprises applying to said surface dissolved in an organic solvent selected from the group consisting of acetone and a hydrocarbon which boils above atmospheric temperature in a concentration sufficient to deposit from 1 to 10 grams per 100 square feet of surface of a compound having the characteristic structure

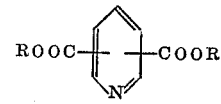

wherein each R is the same alkyl radical selected from the group consisting of ethyl, n-propyl and n-butyl.

12. A method for repelling insects from a surface frequented by insects which comprises applying to said surface, in an amount sufficient to deposit from 1 to 10 grams per 100 square feet of surface of a compound having the characteristic structure

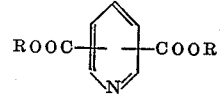

wherein each R is the same alkyl radical selected from the group consisting of ethyl, n-propyl and n-butyl.

References Cited in the file of this patent

Black et al.: J. Org. Chem., vol. 14, pp. 14 to 21, 1949.

Prostenik et al.: Archiv Kemi., vol. 18, pp. 3 to 9, 1946 (Chemical Abstracts, vol. 42, 3398C, 1948).

OSRD Insect Control Committee Report No. 28, Interim Report No. O–94, May 18, 1945. Pub. date: Aug. 1, 1947, 50 pages plus one page of index, particularly at page 27, Orlando No. O–2333, Pyridine-2,3-dicarboxylic acid, dimethyl ester, and pages 1–4, 9, 16 and 21 for methods of using the repellents.